(12) United States Patent
Yamada

(10) Patent No.: US 6,195,199 B1
(45) Date of Patent: Feb. 27, 2001

(54) ELECTRON TUBE TYPE UNIDIRECTIONAL OPTICAL AMPLIFIER

(75) Inventor: Minoru Yamada, Kanazawa (JP)

(73) Assignee: Kanazawa University, Ishikawa, Pref. (JP)

( * ) Notice: Subject to any disclaimer, the term of this patent is extended or adjusted under 35 U.S.C. 154(b) by 0 days.

(21) Appl. No.: 09/178,735

(22) Filed: Oct. 27, 1998

(30) Foreign Application Priority Data

Oct. 27, 1997 (JP) .................................................... 9-293819

(51) Int. Cl.[7] ........................................................ H01S 3/09
(52) U.S. Cl. .......................... 359/333; 359/335; 359/346; 372/2; 372/99
(58) Field of Search ..................................... 359/330, 332, 359/333, 335, 346; 331/94.1; 372/2, 74

(56) References Cited

U.S. PATENT DOCUMENTS

| 4,122,372 | 10/1978 | Walsh . | |
|---|---|---|---|
| 4,323,857 | * 4/1982 | Brau et al. | 372/2 |
| 4,367,551 | * 1/1983 | Gover | 372/2 |
| 4,697,272 | * 9/1987 | Harvey | 372/99 |
| 4,727,550 | * 2/1988 | Chang et al. | 372/2 |
| 4,740,973 | * 4/1988 | Madey et al. | 372/2 |
| 4,745,617 | * 5/1988 | Harvey | 372/96 |
| 4,755,764 | * 7/1988 | Rosenberg et al. | 330/4 |
| 5,263,043 | * 11/1993 | Walsh | 372/102 |
| 5,268,693 | 12/1993 | Walsh . | |

FOREIGN PATENT DOCUMENTS

| 867 982 A2 | * 9/1998 | (EP) . |
|---|---|---|
| 10-270808 | * 10/1998 | (JP) . |
| 911 925 A2 | * 10/1998 | (EP) . |

OTHER PUBLICATIONS

Yamada, M.; IEEE J. Q. E., vol. 35, No. 2, pp. 147–152, Feb. 1999.*

Yariv et al., "Amplification of Radiation by Relativistic Electrons in Spatially Periodic Optical Waveguides", OPTICS COMMUNICATIONS, vol. 24, # 2, pp. 233–236 (1978).

* cited by examiner

Primary Examiner—Nelson Moskowitz
(74) Attorney, Agent, or Firm—Venable; Robert J. Frank; Jeffrey W. Gluck

(57) ABSTRACT

Within a vacuum vessel 10, there are arranged an electron gun 2 emitting an electron beam and an amplification part 3 which amplifies incident light 7 by means of the energy of the electron beam. The amplification part 3 is formed by two wave-like mirrors 4 and 5 made of a metal such as Ag or a multi-layer structure of dielectric materials, said mirrors being separated from each other to constitute not only an electron beam travelling part, but also a light input part 4a, 5a, a light amplifying part 4b, 5b and a light output part 4c, 5c arranged in this order viewed in a travelling direction of the electron beam. The light is made incident upon the light input part at a given incident angle, and propagates along the wave-like or zigzag optical waveguide within the light amplifying part by repeating reflections. Therefore, the wavenumber of the light is increased, and the light is amplified in a unidirectional manner by the energy of the electron beam. The thus amplified light emanates from the light output part at a given exit angle.

17 Claims, 2 Drawing Sheets

ELECTRON TUBE TYPE UNIDIRECTIONAL OPTICAL AMPLIFIER

BACKGROUND OF THE INVENTION

This invention relates to an electron tube type unidirectional optical amplifier for amplifying light propagating in one direction, said electron tube type optical amplifier being applicable to various fields such as electric engineering, electronic engineering, quantum electronics, optoelectronics and laser engineering.

There have been proposed various lasers and travelling wave tubes for performing a unidirectional amplification of light.

Recently, gas laser, solid state laser, liquid laser and semiconductor laser have been practically used. These lasers are typical opto-electronic elements or devices which can perform the light generation and light amplification. In these elements or devices, energy of electrons bound by atoms and molecules in laser materials is used, and thus both forward wave and backward wave are amplified, and the optical amplification can not be performed in a unidirectional manner. Therefore, when light emitted by a laser is reflected by surfaces of lenses, optical fibers and optical disks and is made incident upon the laser, the thus returned light, i.e., back light, is also amplified. This makes laser emission quality and laser amplification quality unstable and generates excess noise.

Up to now, in order to solve the above problem, it has been generally proposed to provide an optical isolator between a laser light source and an optical system such that light reflected by the optical system is not made incident upon the laser. But, since the optical isolator has a bulk mainly made of a magnetic material and is very expensive, the application of the optical isolator is limited. In practice, the optical isolator has been used in a basic study of optical fields and large capacity optical fiber communication systems. However, the optical isolator could not be used in the field of optical disk devices which are small in size and less expensive in cost. Therefore, in the optical disk devices, the degradation of laser quality and the generation of noise due to the back light have been a technical obstacle to the application of lasers.

There has been further proposed an optical integrated circuit, in which a laser generating part, a light amplification part and a light modulating part are integrated as a single integrated unit, and information is processed at a high speed by light. However, such an optical integrated circuit has a problem that the various parts can not be effectively coupled with each other due to the back light from a succeeding part.

A free electron laser has been developed as a device for generating light within a wide wavelength range. The free electron laser operates on a principle which is entirely different from other lasers. In the free electron laser, energy of an electron beam travelling in one direction within a vacuum is given to light, and thus only a light component travelling in the same direction as the electron beam can be amplified. However, since the free electron laser has been developed mainly for generating light, it is not designed to utilize the above mentioned unidirectional amplification characteristic. Moreover, in the free electron laser, an exciting voltage for the electron beam is very high, such as not less than 10 MV, and an extremely high magnetic field is required to vibrate the electron beam. In this manner, the free electron laser has been developed for special high energy applications, and it would not be preferably applied to the electronic field of signal amplification.

A travelling wave tube is a unidirectional electron tube which has an operation frequency higher than the upper limit (about 1 GHz) of the operation frequency of normal electron tubes and transistors operating as a functional electron element having unidirectionality. In this travelling wave tube, a travelling velocity of an electromagnetic wave is decreased by means of a transmission delay line made of a metal, and energy of an electron beam emitted from an electronic gun is given to this electromagnetic wave. Energy loss due to scattering of electrons by collision with to surrounding materials is suppressed by evacuating a space surrounding the electrons.

In this travelling wave tube, the electromagnetic wave is amplified when the velocity of the electron beam coincides with the travelling velocity of the electromagnetic wave, and therefore the electromagnetic wave travelling in an opposite direction is not amplified. Since a wavelength of the electromagnetic wave is decreased in accordance with an increase in its frequency, an upper limit of the frequency of the travelling wave is imposed by a metal processing technique. Therefore, a frequency higher than several tens of GHz (wavelength less than several cm) can not be realized. Consequently, it is impossible at present to manufacture a travelling wave tube which can be applied to light having a wavelength not larger than 1 $\mu$m due to the practical limit of the presently developed metal processing engineering.

To solve the above problems, the inventor of the present application has suggested a unidirectional optical amplifier using an electron beam in a solid state body in a co-pending Japanese Patent Application No. 9-71147 (corresponding to co-pending U.S. patent application Ser. No. 09/046,508 and European Patent Application No. 98 302 257.5). The inventor has theoretically proved that the unidirectional optical amplification is possible by combining an electron beam travelling line for an electron beam emitted into the solid state body with a delay waveguide made of a dielectric material for delaying light to be amplified.

In the above mentioned unidirectional optical amplifier, when the electron beam travelling line is made of ZnSe, a sufficiently high accelerating voltage can not be used, because when the accelerating voltage exceeds 2.5V, electrons can not travel along the travelling line. Then, a spatial phase variation of the electromagnetic field becomes very fine, and the delay waveguide has to be formed precisely, with a precision less than on the order of a nano-meter. At present such a precise processing can not be easily realized.

SUMMARY OF THE INVENTION

The present invention has for its object to provide a novel and useful electron tube type unidirectional optical amplifier, in which the above mentioned problems can be solved by realizing a unidirectional light amplification with the aid of electrons within a vacuum.

According to the invention, an electron tube type unidirectional optical amplifier comprises:

a vacuum vessel;

an electron emission part arranged within said vacuum vessel and emitting an electron beam; and an amplification part provided within said vacuum vessel and amplifying incident light in a unidirectional manner with the electron beam emitted from said electron emission part;

wherein said amplification part includes two wave-like mirrors of undulating cross-section arranged apart from each other by a given distance such that an electron travelling part and a wave-like optical waveguide for increasing a wavenumber of the light are formed, and viewed in a travelling direction of the electron beam, the amplification part consists of a light input part upon which the light to be amplified is made incident at an incident angle, a light amplifying part for amplifying the light emanating from the light input part with the energy of the electron beam in a unidirectional manner, and a light output part from which the amplified light emanates.

In the electron tube type unidirectional optical amplifier according to the invention, since the light impinging upon the light input part propagates along the wave-like or zigzag optical waveguide formed between the two wave-like mirrors, the wavenumber of the light is increased, and a velocity of the light is reduced. Therefore, the light is amplified in a unidirectional manner by the energy of the electron beam travelling along the electron beam travelling part formed between the two wave-like mirrors while the light propagates in the light amplifying part, and the thus amplified light emanates from the light output part.

According to the invention, in the wave-like optical waveguide formed in the amplification part, a velocity component of the light in a direction in which the electron beam travels is reduced to increase a wavenumber of the light, and the unidirectional optical amplification can be realized by utilizing the energy of electrons in a vacuum.

In a preferable embodiment of the electron tube type unidirectional optical amplifier according to the invention, in a range of the light input part, a distance between said two wave-like mirrors is gradually increased toward an input side, a distance between said two wave-like mirrors is kept constant in a range of the light amplifying part, and a distance between said two wave-like mirrors is gradually increased toward an output side in a range of the light output part.

In another preferable embodiment of the electron tube type unidirectional optical amplifier according to the invention, a distance between said two wave-like mirrors is maintained constant over a whole range, but a repetition period of a wave-like configuration of the two wave-like mirrors is gradually increased toward an input side in a range of the light input part, a repetition period of the wave-like configuration of the two wave-like mirrors is remained kept constant in a range of the light amplifying part, and a repetition period of the wave-like configuration of the two wave-like mirrors is gradually increased toward an output side in a range of the light output part.

In these preferable embodiments, the light to be amplified can be made incident upon the light input part at a given incident angle, and within the light amplifying part, the incident light travels along a zigzag path by repeating reflections between the two mirrors at incident angles and reflection angles which are smaller than said given incident angle of the incident light, and is amplified in a unidirectional manner with the aid of the energy of the electron beam. Then, the thus amplified light emanates from the light output part at an exit angle which is substantially equal to said given incident angle.

According to the invention, said two wave-like mirrors may be made of a metal such as silver (Ag) or may be formed by a multi-layer structure of dielectric materials.

DESCRIPTION OF THE PREFERRED EMBODIMENT

The present invention will be explained in detail with reference to embodiments shown in the accompanied drawings.

Figure 1:
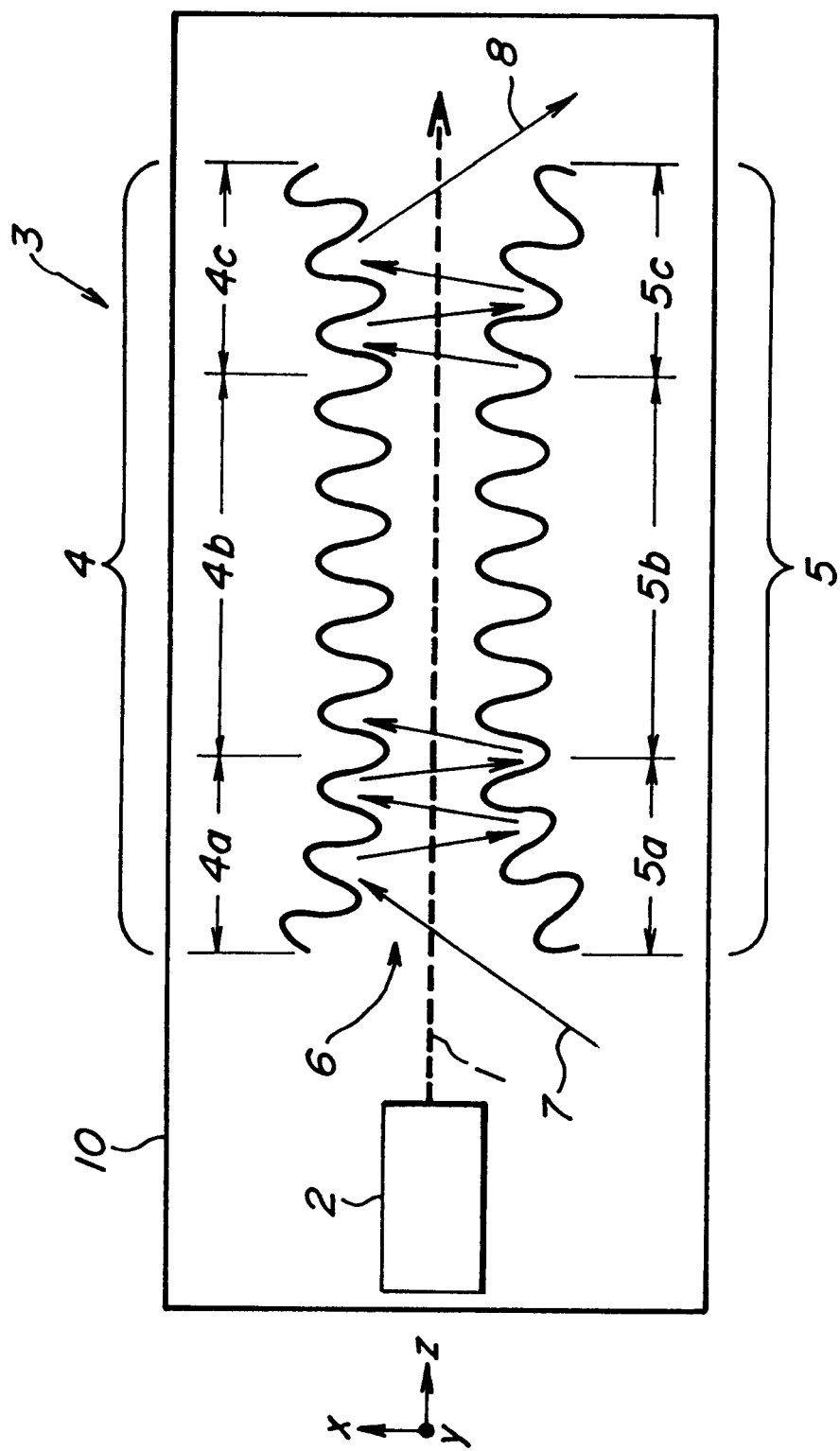
FIG. 1 is a schematic view showing a principal structure of a first embodiment of the electron tube type unidirectional optical amplifier according the invention.

FIG. 1 is a schematic view showing a principal structure of a first embodiment of the electron tube type unidirectional optical amplifier according to the invention. As illustrated in FIG. 1, the electron tube type unidirectional optical amplifier of this embodiment comprises an electron gun 2 constituting an electron emitting part for emitting an electron beam 1, an amplification part 3 for amplifying incident light 7 in a unidirectional manner by utilizing the energy of the electron beam 1 emitted from the electron gun 2, and a vacuum vessel 10 accommodating the electron gun 1 and amplification part 3. According to the invention, at least the electron gun 2 and amplification part 3 are arranged within the vacuum vessel 10 owing to a reason that energy loss of the electron beam emitted from the electron gun 2 due to scattering caused by impinging upon substances surrounding an electron beam travelling part can be suppressed, and a voltage (accelerating voltage) applied to the electron gun 2 can be increased.

The amplification part 3 comprises two wave-like mirrors 4 and 5 separated from each other by such a distance that an electron beam travelling part is formed in an electron beam travelling direction (z axis direction) between the two mirrors. For instance, the two wave-like mirrors 4 and 5 may be separated from each other by a distance which is slightly larger than a width of the electron beam 1 measured in the x axis. The two wave-like mirrors 4 and 5 are divided into light input parts 4a and 5a, light amplifying parts 4b and 5b, and light output parts 4c and 5c, said parts being arranged in this order viewed in the electron beam travelling direction z. In the space between the two wave-like mirrors 4 and 5, there is formed a wave-like or zigzag optical waveguide 6 which can increase the wavenumber of light. The wave-like mirrors 4 and 5 may be made of a metal such as Ag or may be formed by a multi-layer structure of dielectric materials. The wave-like mirrors 4 and 5 have a constant repetition period over their whole length, and are arranged to be mutually shifted in the electron beam travelling direction z by half of the repetition period.

In a range of the light input parts 4a and 5a, a distance between the two wave-like mirrors 4 and 5 is gradually increased toward the input side such that light, i.e., input light 7, to be amplified can be made incident upon the light input parts at a given incident angle. In a range of the amplifying parts 4b and 5b, a distance between the two wave-like mirrors is remained kept constant such that the light is amplified with the aid of energy of the electron beam 1 travelling along the electron beam travelling part 6, while the light propagates along the electron beam travelling part by repeating reflections at incident angles and reflection angles which are smaller than said incident angle to the light input parts 4a and 5a. Moreover, in a range of the light output parts 4c and 5c, a distance between the two wave-like mirrors 4 and 5 is gradually increased toward the output side such that the output light can emanate from the light output parts 4c and 5c at an angle which is substantially equal to said incident angle to the light input parts 4a and 5a.

In a range of the light inputs parts 4a, 5a and light outputs parts 4c, 5c, the light can not be amplified by the energy of the electron beam 1 because the travelling velocity of the electron beam 1 does not coincide with the velocity of the light. Thus, the light is amplified only within the light amplification parts 4b and 5b, in which the two wave-like mirrors 4 and 5 are separated from each other by a constant distance.

Now the principle of the operation of the electron tube type unidirectional optical amplifier of the first embodiment will be explained.

It is assumed that an angular frequency and the wavenumber of the light, i.e., input light are denoted as ω and β, respectively, the energy and the wavenumber of the electrons emitted from the electron gun 2 are represented by $W_b$ and $k_b$, respectively, the energy and the wavenumber of the electrons whose energy has been given to the light 7 are denoted by $W_a$ and $k_a$, and Planck's constant is expressed by $\hbar$. Then, the light 7 can be amplified when the following equations (1) and (2) are satisfied.

$$W_b - W_a = \hbar\omega \quad (1)$$

$$k_b - k_a = \beta \quad (2)$$

The equation (2) is not satisfied in free space because the wavenumber β of light is too small in free space as the velocity of the light is ω/β. Therefore, in the present embodiment, as illustrated in FIG. 1, a velocity of the light is decreased, and the wavenumber β is increased by propagating the light 7 along the zigzag path by means of the wave-like waveguide 6 formed by the two wave-like mirrors 4 and 5.

The effect of the light amplification in the light amplifying parts 4b and 5b in the amplification part 3 has been theoretically analyzed by utilizing the density matrix method, an analysis method of quantum mechanics, and a gain constant g of light is shown by the following equation.

$$g = \frac{2}{\pi}\sqrt{\frac{\mu_O}{\varepsilon_O}}\xi\frac{e^2\lambda JV_e}{mc^2\Delta E} \quad (3)$$

Herein $\mu_0$ is a permeability in vacuum, $\epsilon_0$ is dielectric constant in vacuum, e is charge of an electron, λ is a wavelength of light, m is a mass of an electron, c is a velocity of light in vacuum, ξ is a coupling ratio of light with an electron beam, J is a current density of an electron beam, $V_e$ is an accelerating voltage of an electron gun, and ΔE is a spreading width of an emitted electron beam.

When a length of the light amplification part 4b and 5b is denoted by L, the amplification factor A of the light amplifying parts 4b and 5b may be represented by the following equation (4).

$$A = \exp(gL) \quad (4)$$

Then, an accelerating voltage $V_e$ required for the light amplification is expressed by the following equation (5).

$$V_e = \frac{m}{2e}\left(\frac{\omega}{\beta}\right)^2 \quad (5)$$

Now the operation of the electron tube type unidirectional optical amplifier of this embodiment will be explained.

When electrons are emitted by applying the accelerating voltage $V_e$ to the electron gun 2 and the light 7 is made incident upon the light input parts 4a and 5a of the amplification part 3, the wavenumber β of the light 7 is increased because the light 7 is propagated along the zigzag path, and a velocity of the light is decreased. Thus, the light is amplified by the energy of the electron beam 1 within the light amplification parts 4b and 5b, and the amplified light emanates from the light output parts 4c and 5c. In this case, a repetition period of the wave-like configuration of the wave-like mirrors 4 and 5 is reduced, a velocity of the light is decreased, and therefore the electron gun 2 can be operated at a lower accelerating voltage.

In the embodiment shown in FIG. 1, a repetition period of the wave-like configuration of the wave-like mirrors 4 and 5 is set to 0.4 μm, the wave length λ of the light 7 is set to 0.63 μm, the accelerating voltage $V_e$ is set to 100 KV, the current density J is set to 10 KA/cm² and the length L of the light amplifying parts 4b and 5b is set to 3 mm. Then, from the theoretical analysis explained above, an amplification ratio A of more than ten can be obtained.

Figure 2:
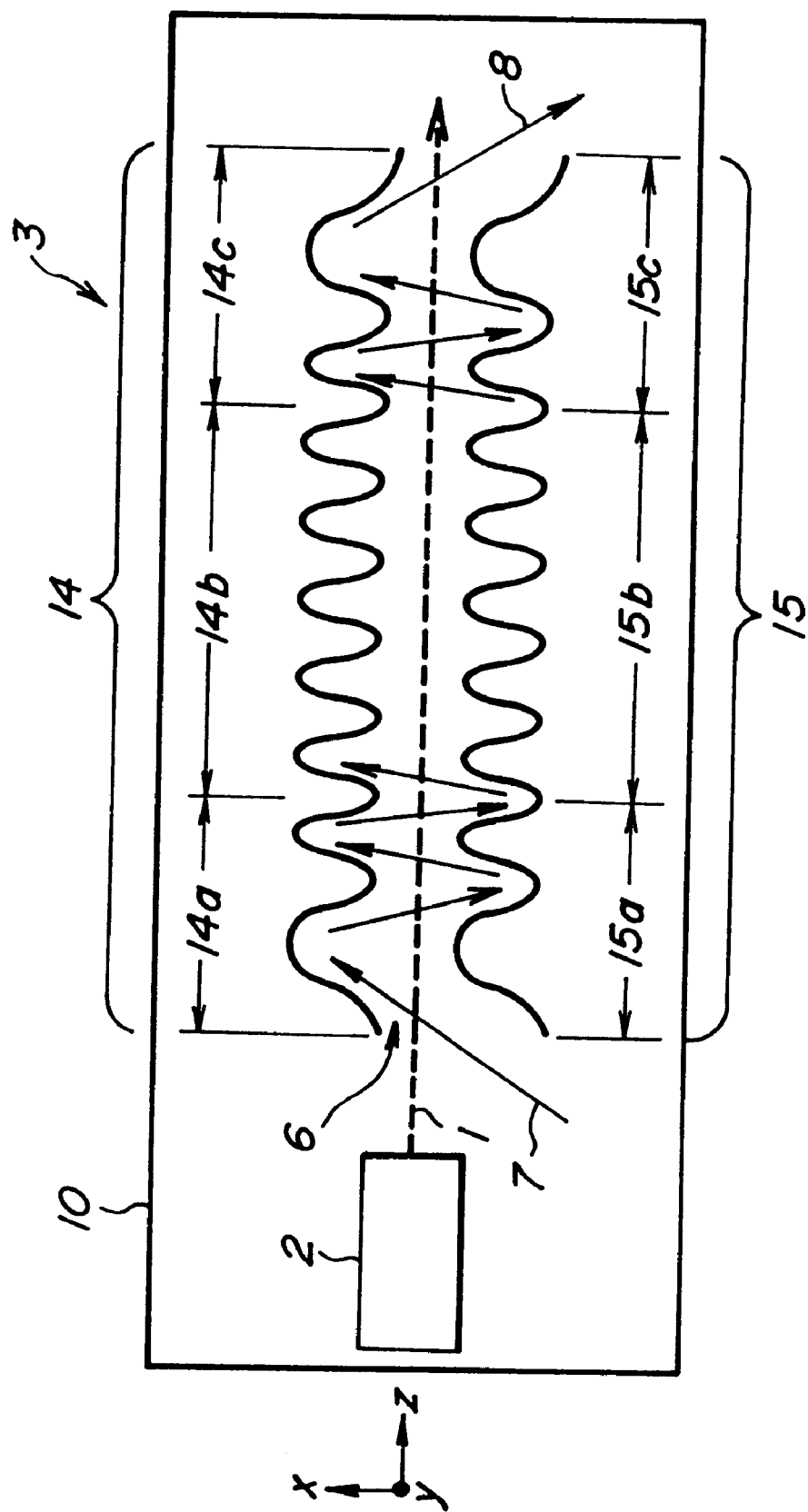
FIG. 2 is a schematic view illustrating a principal structure of a second embodiment of the electron tube type unidirectional optical amplifier according to the invention.

FIG. 2 is a schematic view depicting a second embodiment of the electron tube type unidirectional optical amplifier according to this invention.

The present embodiment differs from the first embodiment in the shape of the two wave-like mirrors, but the remaining structure of the present embodiment is similar to that of the first embodiment. Therefore, similar portions are denoted by the same reference numerals used in FIG. 1.

As shown in FIG. 2, two wave-like mirrors 14 and 15 constitute light input parts 14a and 15a, light amplifying parts 14b and 15b, and light output parts 14c and 15c arranged in this order viewed in a travelling direction of the electron beam. A distance between the two wave-like mirrors 14 and 15 is maintained constant over, the entire length of the mirrors. A wave-like optical waveguide 6 is formed in a space between the wave-like mirrors 14 and 15 such that a wavenumber of light can be increased. Also in the present embodiment, the wave-like mirrors 14 and 15 may be made of a metal such as silver or may be formed by multiple layers of dielectric materials.

In the present embodiment, a repetition period of the light input parts 14a and 15a is increased toward the input side such that incident light 7 to be amplified can be made incident upon the light input parts at a given incident angle. Within a range of the light amplifying parts 14b and 15b, a distance between the wave-like mirrors 14 and 15 is kept constant such that the light is amplified with the aid of energy of the electron beam 1 travelling along the electron beam travelling part 6, while the light propagates in the direction (z axis direction) along the zigzag path over the electron beam travelling part 6 by repeating reflections at incident angles and reflection angles which are smaller than said incident angle to the light input parts 14a and 15a.

Moreover, in a range of the light output parts 14c and 15c, a repetition period of the wave-like configuration of the mirrors 14 and 15 is gradually increased toward the output side such that the output light emanates from the light output parts 14c and 15c at an exit angle which is substantially equal to said incident angle. The wave-like mirrors 14 and 15 of the present embodiment can be manufactured much more easily than wave-like mirrors 4 and 5 of the first embodiment.

In the electron tube type unidirectional optical amplifier of this embodiment, since the repetition period of the wave-like configuration of the two wave-like mirrors 14 and 15 is gradually increased toward both the input and output sides of the wave-like optical waveguide, a similar operation to that of the first embodiment can be attained.

Now the electron tube type unidirectional optical amplifier according to the invention will be compared with the known techniques and the prior application of this inventor (patent application number Heisei 9-71147 (corresponding to co-pending U.S. patent application Ser. No. 09/046,508 and European Patent Application No. 98 302 257.5).

Firstly, the function of the electron tube type optical amplifier according to the invention is essentially different from the known laser in which the light propagating in mutually opposite directions is amplified.

Secondly, the optical amplification in the electron tube type optical amplifier according to the invention has been predicted on the basis of the novel theoretical analysis of the inventor of the present application, as with the optical amplifier described in the co-pending patent application.

Thirdly, the electron tube type unidirectional optical amplifier according to the present invention is similar to the optical amplifier of the co-pending patent application in a point that the optical amplification is performed by the electron beam. However, in the co-pending patent application, use is made of electrons within a solid state substance, whereas in the present invention, electrons in vacuum are utilized. Moreover, the use of the wave-like mirrors as the delayed waveguide in the present invention is different from the co-pending patent.

Fourthly, the electron tube type unidirectional optical amplifier according to the invention resembles the conventional travelling wave tube for a microwave range in so far the electromagnetic wave is amplified by using the electron beam emitted from the electron gun in vacuum, as well as in so far as the delay waveguide for the electromagnetic wave is used. However, the electron tube type optical amplifier according to the invention differs from the conventional travelling wave tube in that in the conventional travelling wave tube the electromagnetic wave is delayed by means of a helix line, whereas in the electron tube type optical amplifier according to the invention, the light (the electromagnetic wave) is delayed by means of the two wave-like mirrors. The conventional travelling wave tube can be used in a microwave range, but could not be used in the light region. Furthermore, the travelling wave tube operates on the theoretical basis that the electromagnetic wave is amplified with a current induced in a delay waveguide made of a metal. But in the electron tube type optical amplifier according to the invention, it has been theoretically probed on the basis of quantum mechanics that the light is directly amplified with the aid of the electron beam. Therefore, according to the invention, it is not always necessary to make the delay waveguide of a metal, but the delay waveguide may be made of dielectric materials.

As explained above in detail, the present invention can provide a novel electron tube type unidirectional optical amplifier. The appearance of such an electron tube type unidirectional optical amplifier is equivalent to the invention of the electron tube and transistor in the light frequency range, and can promote further development in opto-electronic engineering, which has been developed mainly for signal processing, such as optical communication techniques, optical measurement techniques and optical recording techniques. In addition to such opto-electronic engineering, electrical engineering, electronic engineering and information engineering could be developed to an extremely high degree. Moreover, the electron tube type unidirectional optical amplifier according to the present invention can be utilized in applications using high energy light, like material processing and nuclear fusion.

The electron tube type unidirectional optical amplifier according to the invention can be most advantageously used for composing an optical circuit using light signal communication. That is to say, various optical elements and devices such as optical oscillators, optical amplifiers, optical modulators, optical switches and optical memory may be composed into an optical circuit. For instance, when the electron tube type unidirectional optical amplifier according to the invention is used as a light source in an optical fiber communication system or in various optical measurement systems, the problem of the back light can be solved without using an optical isolator. When the electron tube type unidirectional optical amplifier according to the invention is used in an optical pickup for optical disks, the influence of the back light is removed, and thus it is possible to obtain an optical signal of high quality. Furthermore, by suitably changing amplifying conditions, the electron tube type unidirectional optical amplifier according to the invention may be used as various optical functional devices, such as an optical modulator and an optical switch. When the electron tube type unidirectional optical amplifier according to the invention is used in CD (Compact Disk) equipment, low noise can be realized by amplifying a laser light beam in one direction.

In the laser processing machine and laser surgeon's knife and so on, when a laser light source is formed by the electron tube type unidirectional optical amplifier according to the invention, a system can operate stably without being affected by the back light reflected from an object to be processed.

It is to be understood that the present invention is not limited to the embodiments described above, but rather that it encompasses any and all embodiments within the scope of the following claims.

What is claimed is:

1. A unidirectional optical amplifier comprising:
   a vacuum vessel;
   an electron emission part arranged within said vacuum vessel and emitting an electron beam; and
   an amplification part provided within said vacuum vessel and using the electron beam emitted from said electron emission part to amplify incident light in a unidirectional manner, the amplification part comprising two mirrors of undulating cross-section arranged apart from each other by a given distance such that an electron travelling part and a corrugated optical waveguide for increasing a wavenumber of the light are formed, and viewed in a travelling direction of the electron beam, the amplification part comprises a light input part upon which the light to be amplified is made incident at an incident angle, a light amplifying part for amplifying the light emanating from the light input part with the energy of the electron beam in a unidirectional manner, and a light output part from which the amplified light emanates.

2. A unidirectional optical amplifier as claimed in claim 1, wherein in a range of the light input part, a distance between said two mirrors is gradually increased toward an input side, a distance between said two mirrors is kept constant in a range of the light amplifying part, and a distance between said two mirrors is gradually increased toward an output side in a range of the light output part.

3. A unidirectional optical amplifier as claimed in claim 1, wherein a distance between said two mirrors is maintained constant over a whole range, but a repetition period of said undulating cross-section of the two mirrors is gradually increased toward an input side in a range of the light input part, a repetition period of said undulating cross-section of the two mirrors remains constant in a range of the light amplifying part, and a repetition period of said undulating cross-section of the two mirrors is gradually increased toward an output side in a range of the light output part.

4. A unidirectional optical amplifier as claimed in claim 1, wherein said two are made of a metal.

5. A unidirectional optical amplifier as claimed in claim 4, wherein said two mirrors are made of silver (Ag).

6. A unidirectional optical amplifier as claimed in claim 1, wherein said two mirrors are formed by a multiple-layer of dielectric materials.

7. A unidirectional optical amplifier as claimed in claim 2, wherein the repetition period of said two mirrors is set to an order of sub-micron and a length of said light amplifying part is set to several millimeters.

8. A unidirectional optical amplifier as claimed in claim 1, wherein a distance between said two mirrors at least in said light amplifying part is larger than a width of the electron beam.

9. A unidirectional optical amplifier as claimed in claim 2, wherein said two mirrors are made of metal.

10. A unidirectional optical amplifier as claimed in claim 3, wherein said two mirrors are made of metal.

11. A unidirectional optical amplifier as claimed in claim 2, wherein said two mirrors are formed by a multiple-layer of dielectric materials.

12. A unidirectional optical amplifier as claimed in claim 3, wherein said two mirrors are formed by a multiple-layer of dielectric materials.

13. A unidirectional optical amplifier as claimed in claim 2, wherein said two mirrors of undulating cross-section have a constant repetition period in their undulating cross-sections and are arranged such that their undulating cross-sections are mutually shifted in the direction of travel of the electron beam by one-half of said constant repetition period.

14. A unidirectional optical amplifier amplifying incident light using an electron beam and housed in a vacuum, said optical amplifier comprising:

two mirrors of undulating cross-section, arranged in parallel to each other, through which said electron beam is directed, said two mirrors forming a light input section in a first end region, a light amplifying section in a central region, and a light output section in a second end region.

15. A unidirectional optical amplifier as claimed in claim 14, wherein a distance between said two mirrors is maintained constant within said central region; wherein a distance between said two mirrors decreases to the constant distance maintained in said central region in a direction of electron beam travel within said first end region; wherein a distance between said two mirrors increases from the constant distance maintained in said central region in said direction of electron beam travel within said second end region; and wherein a repetition period of said undulating cross-section is maintained constant over the entire lengths of the two mirrors.

16. A unidirectional optical amplifier as claimed in claim 15, wherein said two mirrors are arranged such that their undulating cross-sections are mutually shifted by one-half of said repetition period with respect to each other in said direction of electron beam travel.

17. A unidirectional optical amplifier as claimed in claim 14, wherein a distance between said two mirrors is maintained constant over the entire length of the mirrors; wherein a repetition period of said undulating cross-section is maintained constant within said central region; wherein a repetition period of said undulating cross-section is decreased to the constant repetition period of the central region in a direction of electron beam travel within said first end region; and wherein a repetition period of said undulating cross-section is increased from the constant repetition period of the central region in said direction of electron beam travel within said second end region.

\* \* \* \* \*